US009397526B2

(12) United States Patent
Akasako

(10) Patent No.: US 9,397,526 B2
(45) Date of Patent: Jul. 19, 2016

(54) ELECTRIC MOTOR HAVING STRUCTURE FOR REDUCING COGGING TORQUE

(71) Applicant: FANUC CORPORATION, Yamanashi (JP)

(72) Inventor: Youichi Akasako, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 139 days.

(21) Appl. No.: 14/459,780

(22) Filed: Aug. 14, 2014

(65) Prior Publication Data

US 2015/0048706 A1 Feb. 19, 2015

(30) Foreign Application Priority Data

Aug. 19, 2013 (JP) ................................ 2013-169722

(51) Int. Cl.

| | |
|---|---|
| ***H02K 21/12*** | (2006.01) |
| ***H02K 1/27*** | (2006.01) |
| ***H02K 1/28*** | (2006.01) |
| ***H02K 21/14*** | (2006.01) |
| *H02K 29/03* | (2006.01) |

(52) U.S. Cl.

CPC .............. *H02K 1/2706* (2013.01); *H02K 1/278* (2013.01); *H02K 1/28* (2013.01); *H02K 21/14* (2013.01); *H02K 29/03* (2013.01); *H02K 2201/06* (2013.01)

(58) Field of Classification Search

CPC .......... H02K 1/278; H02K 1/28; H02K 1/274
USPC ....................................... 310/156.01–156.84
See application file for complete search history.

(56) References Cited

U.S. PATENT DOCUMENTS

| | | | |
|---|---|---|---|
| 4,642,502 A * | 2/1987 | Carpenter | H02K 1/278 310/156.12 |
| 5,397,951 A * | 3/1995 | Uchida | H02K 1/278 310/156.21 |
| 6,940,199 B2 * | 9/2005 | Imamura | H02K 1/278 310/156.01 |

(Continued)

FOREIGN PATENT DOCUMENTS

| | | |
|---|---|---|
| JP | 2005-160131 A | 6/2005 |
| JP | 2007006621 A | 1/2007 |

(Continued)

OTHER PUBLICATIONS

English Machine Translation for Japanese Publication No. 2005-160131 published Jun. 16, 2005, 7 pages.

(Continued)

*Primary Examiner* — Thanh Lam
(74) *Attorney, Agent, or Firm* — Fredrikson & Byron, P.A.

(57) ABSTRACT

A synchronous electric motor having a structure for reducing cogging torque generated by the positioning error of a permanent magnet. Protrusions are alternately arranged in regions A and B in the circumferential direction of an iron core. Therefore, with respect to neighboring magnets positioned on both sides of the first protrusion, in region B, where the protrusion does not exit, ends of the neighboring magnets are attracted to each other by magnetic force. On the other hand, with respect to the neighboring magnets positioned on both sides of the second protrusion, in region A, where the protrusion does not exit, ends of the neighboring magnets are attracted to each other by magnetic force resulting in being inclined in opposing directions, and thus the generated cogging torque is significantly reduced.

2 Claims, 7 Drawing Sheets

(56) References Cited

U.S. PATENT DOCUMENTS

| | | | | |
|---|---|---|---|---|
| 8,344,569 | B2 | 1/2013 | Jöckel | |
| 2009/0001839 | A1 * | 1/2009 | Masayuki | H02K 29/08 310/156.16 |
| 2009/0195104 | A1 * | 8/2009 | Akutsu | H02K 1/278 310/156.38 |
| 2009/0224620 | A1 * | 9/2009 | Okubo | H02K 1/278 310/156.25 |
| 2012/0139372 | A1 | 6/2012 | Nakano et al. | |
| 2013/0043757 | A1 * | 2/2013 | Kagami | H02K 1/2766 310/156.53 |
| 2013/0207501 | A1 * | 8/2013 | Tomohara | H02K 1/2766 310/156.48 |

FOREIGN PATENT DOCUMENTS

| | | | |
|---|---|---|---|
| JP | 2010-004663 | A | 1/2010 |
| JP | 2011-015458 | A | 1/2011 |
| WO | 2008031726 | A1 | 3/2008 |
| WO | 2011064834 | A1 | 6/2011 |

OTHER PUBLICATIONS

English Machine Translation for Japanese Publication No. 2010-004663 published Jan. 7, 2010, 21 pages.

English Machine Translation for Japanese Publication No. 2011-015458 published Jan. 20, 2011, 20 pages.

English Machine Translation of Description and Claims for PCT Publication No. 2008/031726 published Mar. 20, 2008, 25 pages.

* cited by examiner

III (A+B)
28
COGGING TORQUE
I (A)
24
26
COGGING TORQUE
II (B)
24
26
COGGING TORQUE

ELECTRIC MOTOR HAVING STRUCTURE FOR REDUCING COGGING TORQUE

BACKGROUND OF THE INVENTION

1. Field of the Invention

The present invention relates to an electric motor having a structure for reducing cogging torque.

2. Description of the Related Art

Generally, in an electric motor having an SPM-type (surface permanent magnet) rotor wherein a plurality of permanent magnets are attached to a surface of a rotor core result in cogging torque due to magnetic attractive force between the permanent magnet and a tooth of a stator core becomes larger. Since the cogging torque may cause a rotational unevenness of the electric motor, the cogging torque needs to be lowered.

As one measure for lowering the cogging torque, a surface of the permanent magnet may be formed as a curved surface (see FIG. 9). However, even when the magnet shape is designed so as to lower the cogging torque, the desired (i.e., low) cogging torque cannot be obtained unless the permanent magnet is accurately positioned and attached to a predetermined position of the rotor core.

Therefore, in order to lower the cogging torque, it is necessary that the permanent magnet be accurately positioned and attached to a predetermined position of the rotor core. As a related art, a technique for forming a groove for positioning a magnet on a surface of a rotor, and a technique for aligning a plurality of permanent magnets, each having a trapezoidal shape, in a circumferential direction of a rotor so that the neighboring magnets are oriented to the opposite directions are described in JP 2007-006621 A.

Generally, a permanent magnet is a sintered body, and thus it is difficult to manufacture a permanent magnet with high dimensional accuracy. Therefore, each permanent magnet is adhered to a rotor while having a certain degree of positional error (gap) or allowance. In this regard, in a synchronous electric motor wherein the number of slots of a stator cores is “s” and the number of permanent magnets adhered to a rotor core is “2p” (i.e., “p” pairs of magnets are adhered), when a lowest common multiple (LCM) of “s” and “2p” is an odd multiple of “p” (i.e., the LCM is indivisible by “2p”), the cogging torque is generated by the permanent magnet which is misaligned with an ideal magnet center position, as explained below.

FIG. 8 is a schematic view of an iron core 100 constituting a conventional rotor. Iron core 100 has a plurality of protrusions 102 for positioning permanent magnets. Each protrusion 102 is a ridge-shaped portion extending straightly and parallel to an axial direction of the core. As shown in FIG. 9, between each protrusion 102, a permanent magnet 104 having a generally rectangular parallelepiped shape is adhered the core so as to constitute a rotor 106. In this case, the number of protrusions 102 is sixteen, and the number of permanent magnets 104 is also sixteen (i.e., eight pairs of magnets are provided).

In light of dimensional tolerance of each permanent magnet 104 and adhering the permanent magnet, as shown in FIG. 10, distance “d” between each protrusion 102 of iron core 100 is larger than width “w” of each permanent magnet 104. Therefore, when the permanent magnets are adhered to iron core 100, as shown in FIG. 10, neighboring permanent magnets 104 on both sides of a protrusion **102*a* are attracted to each other in the direction of an arrow by magnetic attractive force thereof and are positioned with substantially no gap between each magnet and protrusion 102*a*, and neighboring permanent magnets 104 on both sides of a protrusion 102*b* are positioned with a gap between each magnet and protrusion 102*b*. In other words, each permanent magnet is offset or deviated from an ideal center position as indicated by a dotted line 108**.

When rotor 106 is positioned inside a stator core 112 having nine slots 110 so as to constitute a synchronous electric motor 114 as shown in FIG. 11, an LCM of the number of the slots (s=9) and the number of pairs of poles (p=8) is an odd multiple of “p” (i.e., the LCM=72). FIG. 12 shows the cogging torque generated a number of times per revolution of the electric motor, wherein the number corresponds to the LCM of “s” and “p.” In FIG. 12, a dashed line 116 indicates the cogging torque when each permanent magnet is positioned at ideal center position 108 (see FIG. 10), and a solid line 118 indicates the cogging torque when the permanent magnet is deviated from the ideal center position as shown in FIG. 10. In this regard, solid line 118 includes a plurality of (five in the drawing) graphs, wherein the cogging torque is increased as an amount of deviation of the magnet from the ideal center position is increased.

As can be seen from FIG. 12, in the synchronous electric motor having “s” slots and “2p” poles, when the LCM of “s” and “p” is the odd multiple of “p,” the neighboring permanent magnets are displaced closer to each other by the magnetic attractive force so as to form a pair of magnets, whereby each permanent magnet is offset or deviated from the ideal position. Therefore, relatively large cogging torque is generated and the performance of the motor may be deteriorated. In addition, in JP 2007-006621 A, the shape of each permanent magnet is a trapezoid which is more expensive than a permanent magnet having a simple rectangular parallelepiped.

SUMMARY OF THE INVENTION

Thus, the object of the present invention is to provide a synchronous electric motor having a structure for reducing the cogging torque generated by the positioning error of the permanent magnet.

The present invention provides a synchronous electric motor having s slots and 2p poles, wherein a lowest common multiple of s and p is an odd multiple of p, the synchronous electric motor having a rotor comprising: an iron core having a plurality of protrusions for positioning permanent magnets; and a plurality of permanent magnets positioned on the iron core, wherein the protrusions are arranged on the iron core so that one end of each permanent magnet is inclined towards one of neighboring permanent magnets so as to be attracted to the one of the neighboring permanent magnets, and so that the other end of each permanent magnet is inclined towards the other of neighboring permanent magnets so as to be attracted to the other of the neighboring permanent magnets.

In a preferred embodiment, the iron core includes a first region and a second region defined by dividing the iron core into two halves in a direction of a rotation axis thereof, wherein, in the first region, first protrusions are arranged on a boundary between neighboring permanent magnets alternately in a circumferential direction of the iron core, wherein, in the second region, second protrusions are arranged on a boundary between neighboring permanent magnets alternately in a circumferential direction of the iron core, and wherein the protrusion arranged on one boundary is positioned either one of the first and second regions.

In a preferred embodiment, each protrusion has a trapezoidal shape having a height in a direction of a rotation axis of the iron core, wherein the iron core includes a first region and a second region defined by dividing the iron core into two halves in a direction of a rotation axis thereof, and wherein a first protrusion and a second protrusion are alternately positioned in a circumferential direction of the iron core, the first protrusion having a long side positioned in the first region and a short side positioned in the second region, and the second protrusion having a short side positioned in the first region and a long side positioned in the second region.

In a preferred embodiment, each protrusion has a ridge shape extending by a distance shorter than a length of the iron core in a rotation axis thereof, wherein the iron core includes a first region and a second region defined by dividing the iron core into two halves in a direction of a rotation axis thereof, and wherein a first protrusion and a second protrusion are alternately positioned in a circumferential direction of the iron core, the first protrusion extending to an axial end of the iron core in the first region and not extending to an axial end of the iron core in the second region, the second protrusion extending to an axial end of the iron core in the second region and not extending to an axial end of the iron core in the first region.

In a preferred embodiment, each permanent magnet has a rectangular parallelepiped shape.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
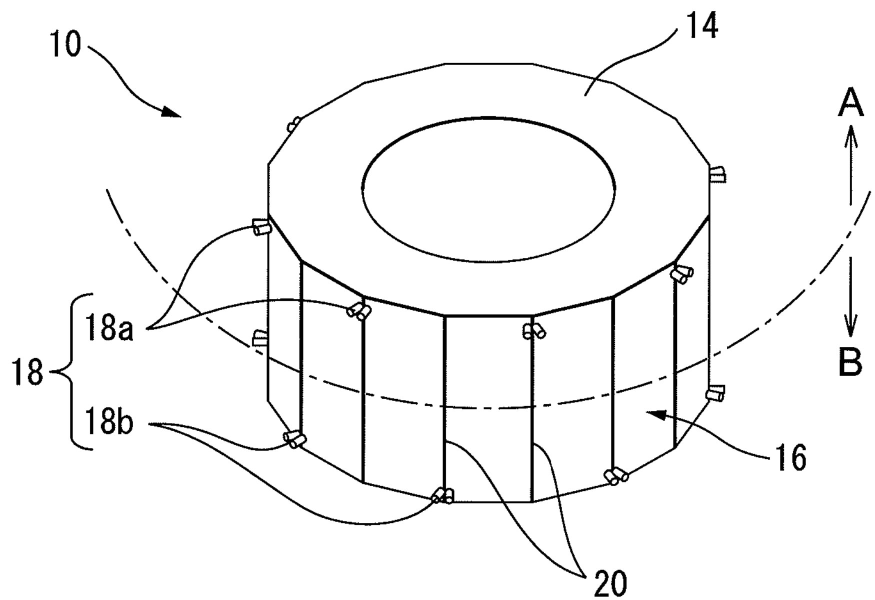
FIG. 1 is a view of a schematic configuration of an iron core constituting a rotor of an electric motor according to a first embodiment of the present invention.
Figure 11:
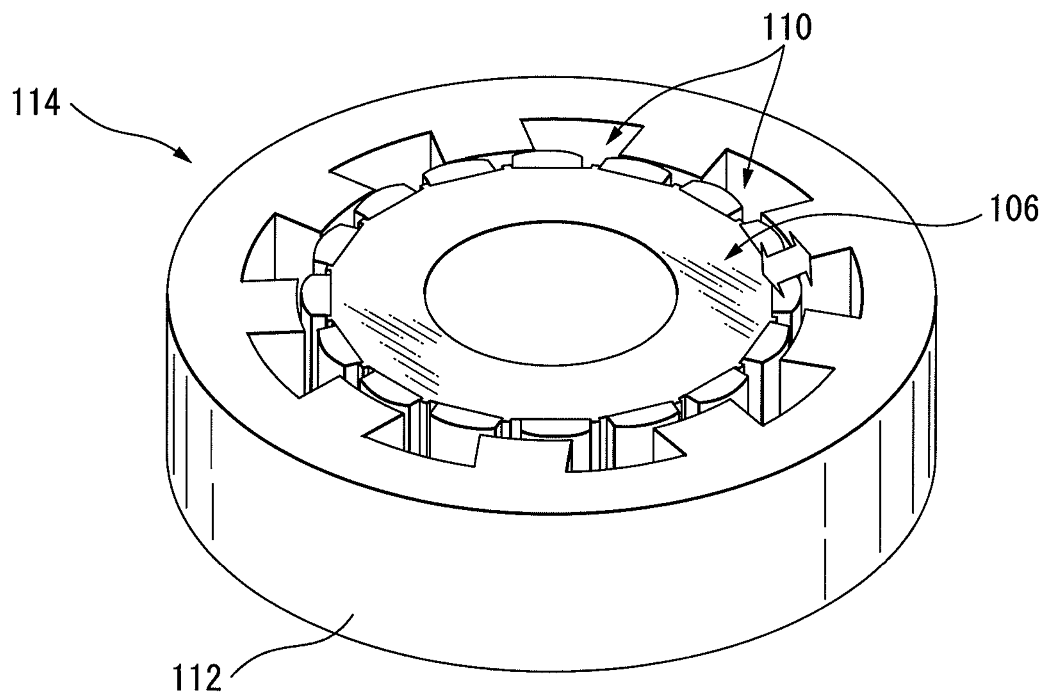
FIG. 11 is a view showing a state wherein the rotor of FIG. 9 is positioned in a stator core.

FIG. 1 is a view of a schematic configuration of a rotor iron core (hereinafter, referred to as merely "iron core") 10 constituting a rotor of an electric motor according to a first embodiment of the present invention. Iron core 10 is an SPM type rotor wherein a plurality of (in this case, sixteen or eight pairs of) permanent magnets 12 (see FIG. 2) are adhered thereto, and has a generally cylindrical main body (or sleeve) 14, an outer side surface (or magnet adhering surface) 16 to which the permanent magnets are adhered, and protrusions 18 for positioning the permanent magnets. Iron core (rotor) 10 having the permanent magnets is used in a synchronous electric motor wherein a lowest common multiple (LCM) of the number of pairs of poles "p" and the number of slots "s" is an odd multiple of "p" (i.e., the LCM is indivisible by "2p"). For example, iron core 10 may be positioned in a stator core 112 having nine slots as shown in FIG. 11 so as to constitute a synchronous electric motor. In the present invention, since the configuration of the stator core may be the same as the prior art, a detailed explanation thereof will be omitted.

As shown in FIG. 1, each protrusion 18 arranged on outer side surface 16 of main body 14 is positioned on a boundary 20 of an adhering position of each permanent magnet 12. In the illustrated embodiment, boundary 20 is indicated by a straight line extending on outer side surface 16 and parallel to an axial direction of rotor 10. Concretely, with respect to a first region (or region A) and a second region (or region B) defined by dividing iron core 10 into two halves in a direction of a rotation axis thereof (the vertical direction in FIG. 1), protrusions 18*a* are arranged on boundary 20 alternately in the circumferential direction of iron core 10 in the upper half (or region A), and protrusions 18*b* are arranged on boundary 20 alternately in the circumferential direction of iron core 10 in the lower half (or region B). In this regard, on each boundary 20, protrusion 18 is arranged in only one of regions A and B. In other words, the protrusions are positioned in regions A and B alternately in the circumferential direction of main body 14.

Figure 2:
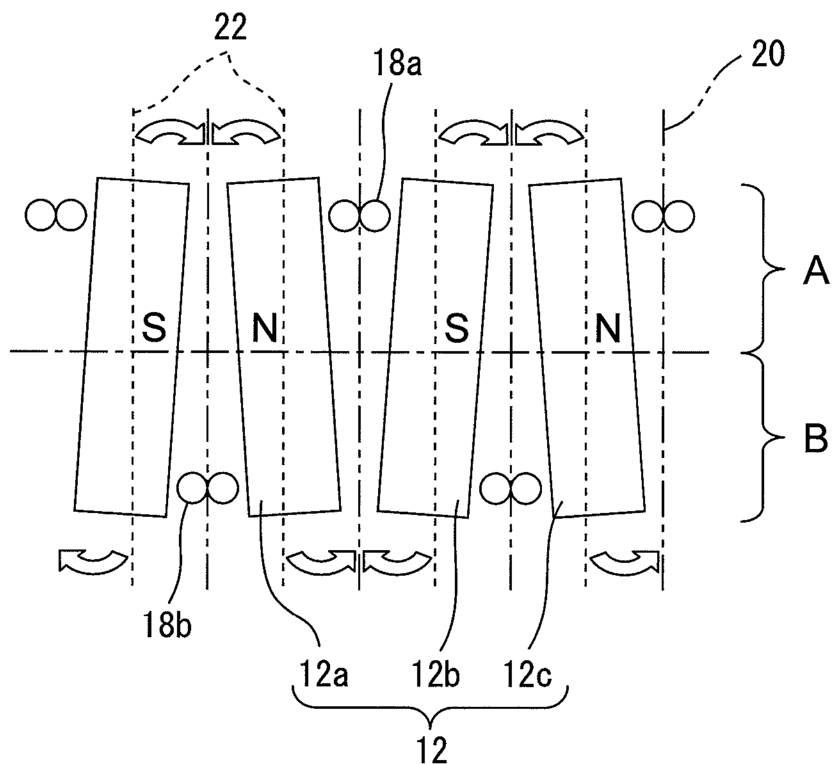
FIG. 2 is a view schematically showing a change in the position of each permanent magnet when the magnets are adhered to the iron core of FIG. 1.

FIG. 2 is a view schematically showing a change in the position of each permanent magnet when the magnet is adhered to iron core 10 of FIG. 1. As described above, protrusions 18 (protrusions 18*a* and 18*b*) are alternately arranged in regions A and B in the circumferential direction of iron core 10. Therefore, with respect to the neighboring magnets positioned on both sides of first protrusion 18*a* (for example, magnets 12*a* and 12*b*), in region B, where the protrusion does not exit, ends of the neighboring magnets are attracted to each other by magnetic force. On the other hand, with respect to the neighboring magnets positioned on both sides of second protrusion 18*b* (for example, magnets 12*b* and 12*c*), in region A, where the protrusion does not exit, ends of the neighboring magnets are attracted to each other by magnetic force. In such a manner, each permanent magnet 12 is deviated or inclined relative to an ideal magnet center position as indicated by a dashed line 22. However, as shown in FIG. 2, since the neighboring permanent magnets are inclined in opposing directions, the generated cogging torque is significantly reduced. Hereinafter, the reason is explained with reference to FIG. 3.

Figure 3:
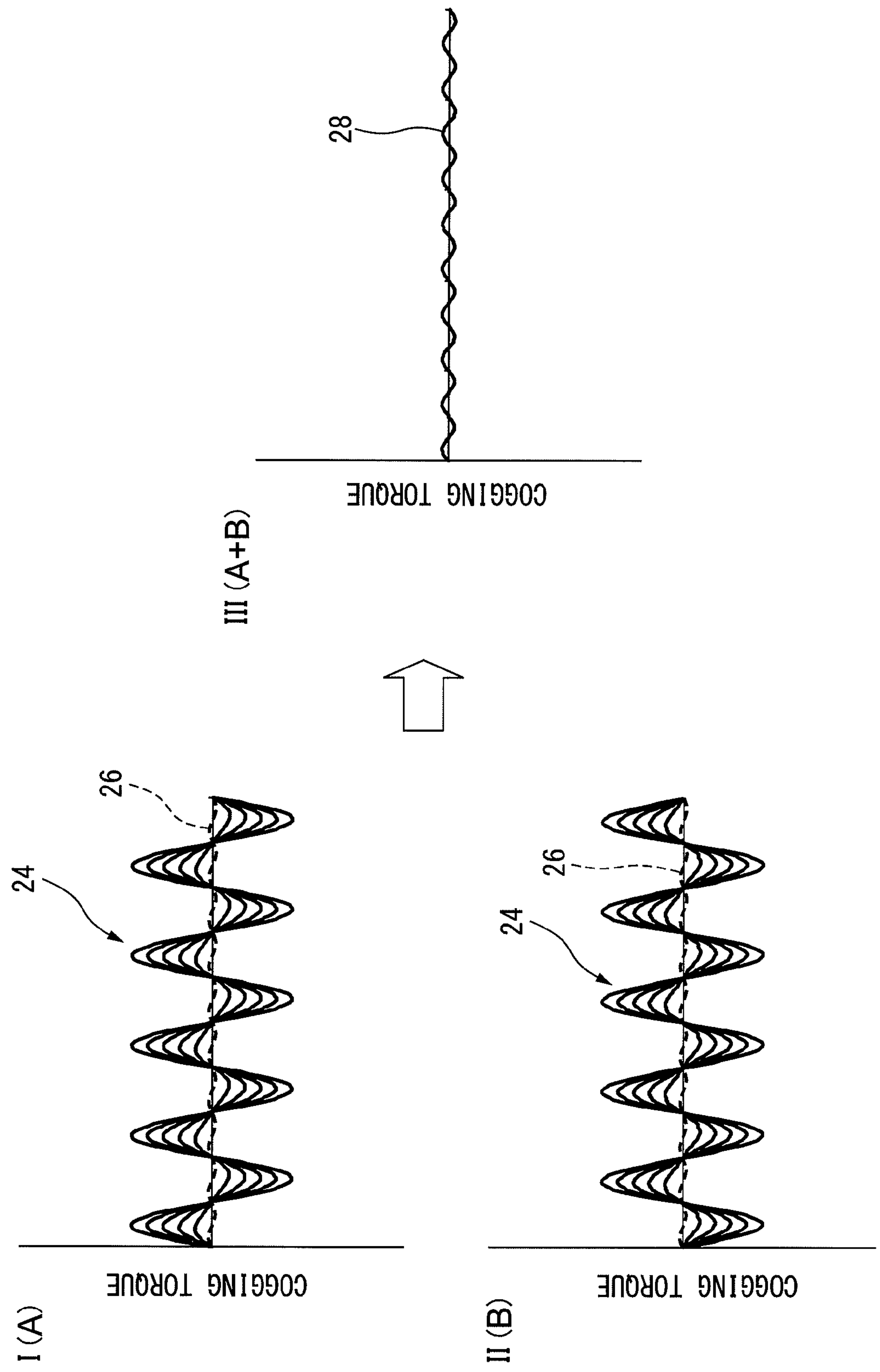
FIG. 3 is a view explaining cancel effect of cogging torque in the electric motor of the present invention.
Figure 12:
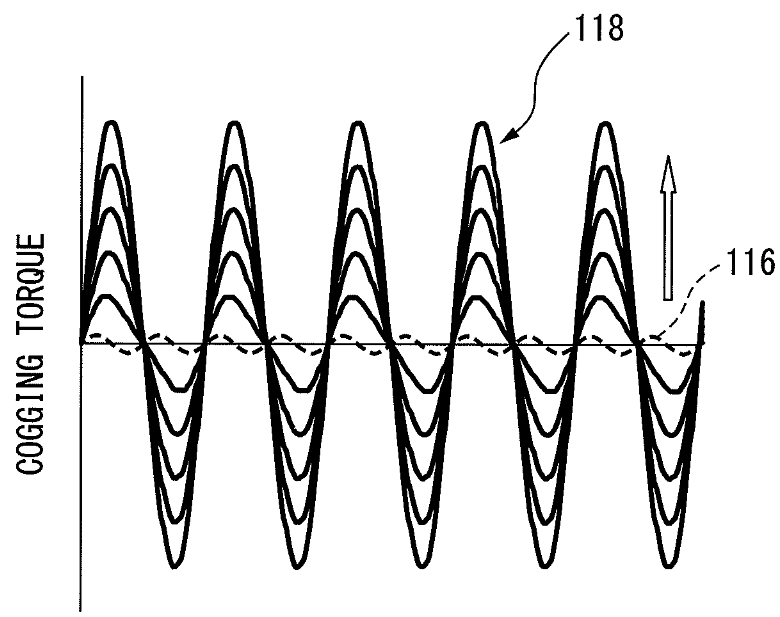
FIG. 12 is a view explaining cogging torque generated in the electric motor of the prior art.

FIG. 3 is a graph showing cogging torque generated a number of times per revolution of the electric motor of the invention, wherein the number corresponds to the LCM of "s" and "p." In FIG. 3, graphs I and II show cogging torque generated in regions A and B, respectively, wherein the cogging torque is indicated by five solid lines 24 corresponding to the amounts of deviation of the magnets. In addition, dashed lines 26 in FIG. 3 indicate ideal cogging torque wherein each permanent magnet is aligned and positioned relative to the ideal magnet center position (indicated by dashed line 22 in FIG. 2). As explained with reference to FIG. 12, the cogging torque is generated in regions A and B of the rotor corresponding to the respective amounts of deviation of the magnets. However, as is apparent from the comparison of graphs I and II in FIG. 3, between regions A and B, the phase of the cogging torque is shifted by an amount corresponding to one pole. Therefore, the cogging torques of regions A and B cancel each other out, resulting in that the cogging torque obtained in this case is substantially equivalent to the cogging torque wherein each permanent magnet is aligned with an ideal magnet center position (indicated by dashed line 22 in FIG. 2), as indicated by a graph III (or a solid line 28).

Next, the reason why the phase of the cogging torque, between regions A and B, is shifted by the amount corresponding to just one pole is explained. In a synchronous electric motor having "s" slots and "2p" poles, in the case that a lowest common multiple of s and p is an odd multiple of p as in the motor of the invention, when each permanent magnet 12 is deviated (or inclined) from ideal magnet center position 22, the cogging torque is generated a number of times per revolution of the motor, wherein the number corresponds to the LCM of "s" and "p." In this case, a cycle θ of the cogging torque can be represented by following equation (1), wherein "LCM (p, s)" means the LCM of p and s, and "m" means an odd number (m=2n−1; "n" is a natural number).

$$\theta=2\pi/LCM(p,s)=2\pi/(p\times m) \quad (1)$$

As can be seen from equation (1), if number "m" is an even number, the LCM(p, s) is dividable by "2p," and thus the cogging torque due to the deviation of the permanent magnet from the ideal magnet center position is not generated.

In this regard, as shown in FIG. 2, by inclining one end of each permanent magnet (for example, magnet 12*b*) in a direction so as to be attracted by one of neighboring magnets (12*c*) in region A, and by inclining the other end of the permanent magnet in a direction so as to be attracted by the other of the neighboring magnets (12*a*) in region B, the phase of the cogging torque is shifted between regions A and B. An amount of the phase-shifting ϕ corresponds to just one pole, and can be represented by following equation (2).

$$\phi=2\pi/2p \quad (2)$$

By equations (1) and (2), following equation (3) is developed.

$$\theta=2\pi/(p\times(2n-1))=\phi/(n-\tfrac{1}{2}) \quad (3)$$

By modifying equation (3), amount of phase-shifting ϕ can be represented following equation (4).

$$\phi=\theta\times(n-\tfrac{1}{2}) \quad (4)$$

As can be seen from equation (4), amount of phase-shifting ϕ between regions A and B corresponds to a half of one cycle. As a result, as can be seen from graphs I and II in FIG. 3, the cogging torques cancel each other out between regions A and B, whereby substantially ideal cogging torque can be obtained as indicated by graph III.

As explained above, when an LCM of the number of pairs of poles "p" and the number of slots "s" is an odd multiple of "p" (i.e., the LCM is indivisible by "2p") as in the present invention, the cogging torque due to the deviation of the permanent magnet from the ideal magnet center position can be canceled, by arranging protrusions (positioning portions) so that the neighboring magnets are symmetrically inclined in opposing directions with respect to the axial direction of the iron core, by attractive force of the magnets.

As shown in FIGS. 1 and 2, in the first embodiment, each protrusion 18 is illustrated as two pin-shaped (or columnar) members adjacent to each other wherein boundary 20 is positioned therebetween. However, each protrusion may have another shape as long as the protrusion can limit the position and orientation of each permanent magnet so that the neighboring magnets are inclined in opposing directions by attractive force thereof. For example, each protrusion 18 may have one pin-shaped member or three or more pin-shaped members, and the pin-shaped member may be formed as an elliptic column or a prismatic column.

Figure 4:
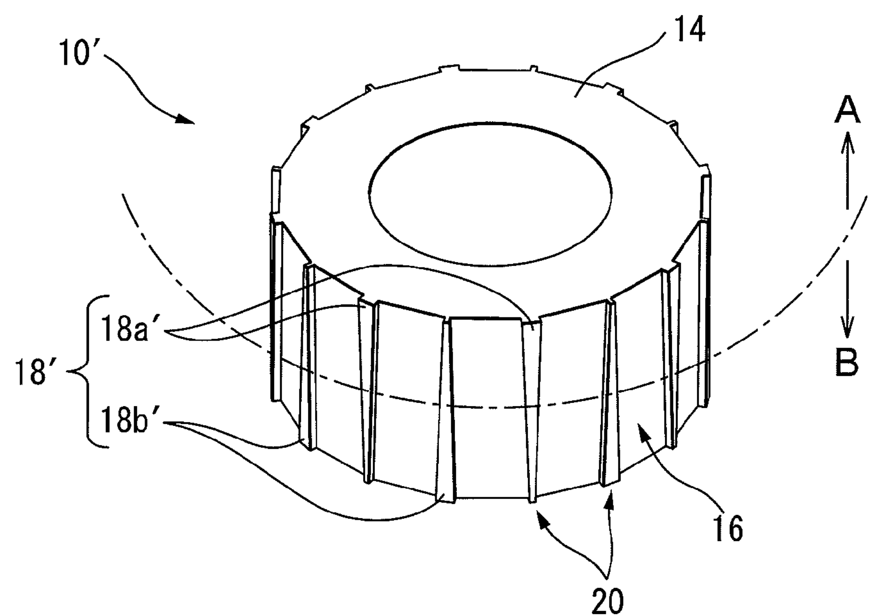
FIG. 4 is a view of a schematic configuration of an iron core constituting a rotor of an electric motor according to a second embodiment of the present invention.

FIG. 4 is a view of a schematic configuration of an iron core 10' constituting a rotor of an electric motor according to a second embodiment of the present invention. Since the second embodiment may be the same as the first embodiment except for a structure of a protrusion, the same reference numerals are added to the corresponding components and a detailed explanation thereof will be omitted.

As shown in FIG. 4, a protrusion 18' arranged on outer surface 16 of main body 14 of iron core 10' has a trapezoidal shape having a height generally corresponding to the axial length of main body 14. Further, protrusion 18' is formed on boundary 20 between an adhering position of each permanent magnet 12 (in the illustrated embodiment, the boundary is indicated by a straight line extending on outer side surface 16 and parallel to the axial direction of rotor 10'). Concretely, with respect to a first region (or region A) and a second region (or region B) defined by dividing iron core 10' into two halves in a direction of a rotation axis thereof (the vertical direction in FIG. 4), a first protrusion 18*a*' and a second protrusion 18*b*' are alternately positioned on main body 14 in the circumferential direction thereof, wherein protrusion 18*a*' has a long side positioned in region A and a short side positioned in region B, and protrusion 18*b*' has a short side positioned in region A and a long side positioned in region B.

Figure 5:
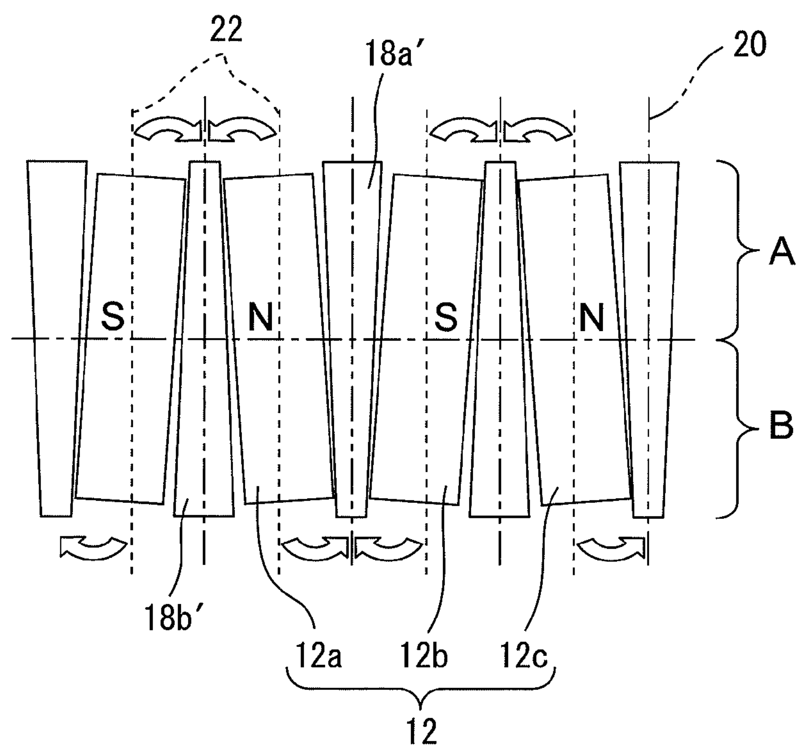
FIG. 5 is a view schematically showing a change in the position of each permanent magnet when the magnets are adhered to the iron core of FIG. 4.

FIG. 5 is a view schematically showing a change in the position of each permanent magnet when the magnets are adhered to iron core 10' of FIG. 4. As explained above, the long side (or a potion having a large width) and the short side (or a portion having a small width) of protrusions 18' are alternately positioned on main body 14 in the circumferential direction thereof. Therefore, with respect to the neighboring permanent magnets (for example, magnets 12*a* and 12*b*) between which protrusion 18*a*' having the long side positioned in region A exists, the ends of the magnets are attracted to each other in region B where the short side of protrusion 18*a*' exists. On the other hand, with respect to the neighboring permanent magnets (for example, magnets 12*b* and 12*c*) between which protrusion 18*b*' having the long side positioned in region B exists, the ends of the magnets are attracted to each other in region A where the short side of protrusion 18*b*' exists. As such, although each permanent magnet 12 is deviated or inclined from the ideal magnet center position indicated by dashed line 22. However, as shown in FIG. 5, the neighboring permanent magnets are inclined in the opposing directions, the generated cogging torque is significantly reduced. The reason therefor has been explained with reference to FIG. 3.

As in the second embodiment, when magnet adhering surface 16 is machined so that the protrusion has a trapezoidal shape, the machining can be easily carried out by moving a tool such as an end mill while the tool is inclined relative to an axis of rotor iron core 10', whereby a machining cost may be low. Further, it is not necessary to form each permanent magnet into a variant shape such as a trapezoidal (in other words, not a simple rectangular parallelepiped), and thus the magnet can also be manufactured at low cost.

In the second embodiment, each protrusion 18' has a trapezoidal shape wherein boundary 20 is a symmetry axis thereof. However, each protrusion may have another shape as long as the protrusion can limit the position and orientation of each permanent magnet so that the neighboring magnets are inclined in opposing directions by attractive force thereof. For example, the trapezoid may be asymmetric, and/or a side of the trapezoid may not be a straight line.

Figure 6:
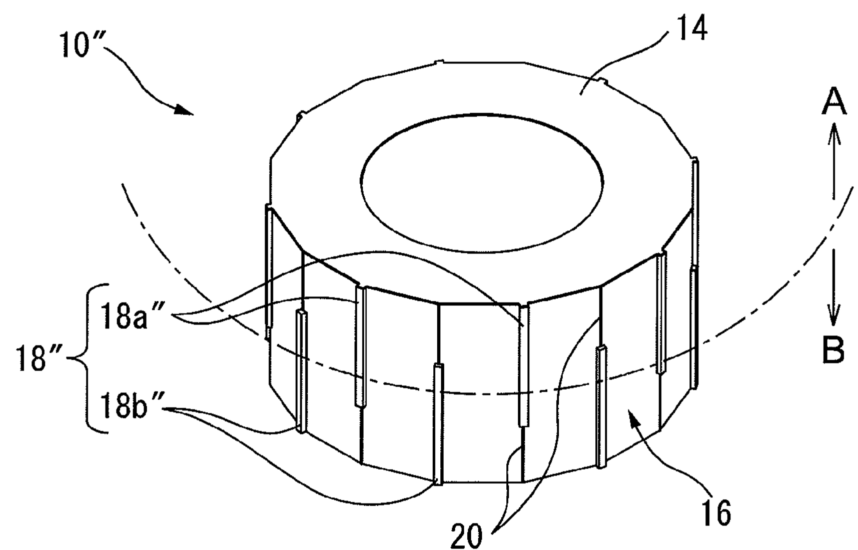
FIG. 6 is a view of a schematic configuration of an iron core constituting a rotor of an electric motor according to a third embodiment of the present invention.

FIG. 6 is a view of a schematic configuration of an iron core 10" constituting a rotor of an electric motor according to a third embodiment of the present invention.

Since the third embodiment may be the same as the first or second embodiment except for a structure of a protrusion, the same reference numerals are added to the corresponding components and a detailed explanation thereof will be omitted.

As shown in FIG. 6, a protrusion 18" arranged on outer surface 16 of main body 14 of iron core 10" has a ridge shape extending straightly and parallel to the axial direction of the iron core. Further, protrusion 18" is formed on boundary 20 between an adhering position of each permanent magnet 12 (in the illustrated embodiment, the boundary is indicated by a straight line extending on outer side surface 16 and parallel to the axial direction of rotor 10"), and the axial length of each protrusion 18" is shorter than the axial length of main body 14. In addition, with respect to a first region (or region A) and a second region (or region B) defined by dividing iron core 10" into two halves in a direction of a rotation axis thereof (the vertical direction in FIG. 6), a first protrusion **18*a*" and a second protrusion 18*b*" are alternately positioned on main body 14 in the circumferential direction thereof, wherein protrusion 18*a*" extends to or reaches an axial end of main body 14 in region A and does not extend to or reach an axial end of main body 14 in region B, and protrusion 18*b*" extends to or reaches an axial end of main body 14 in region B and does not extend to or reach an axial end of main body 14** in region A.

Figure 7:
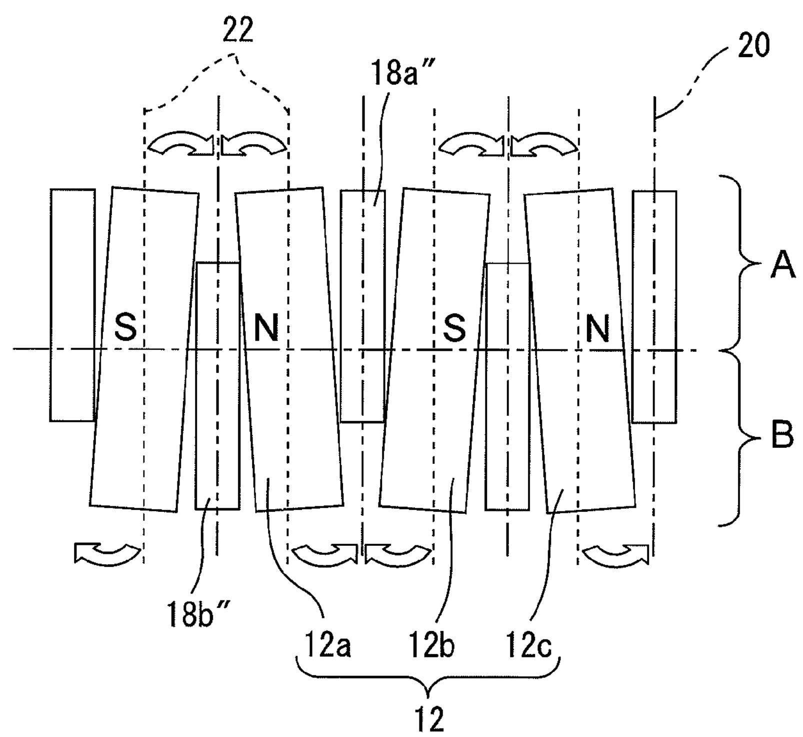
FIG. 7 is a view schematically showing a change in the position of each permanent magnet when the magnets are adhered to the iron core of FIG. 6.
Figure 8:
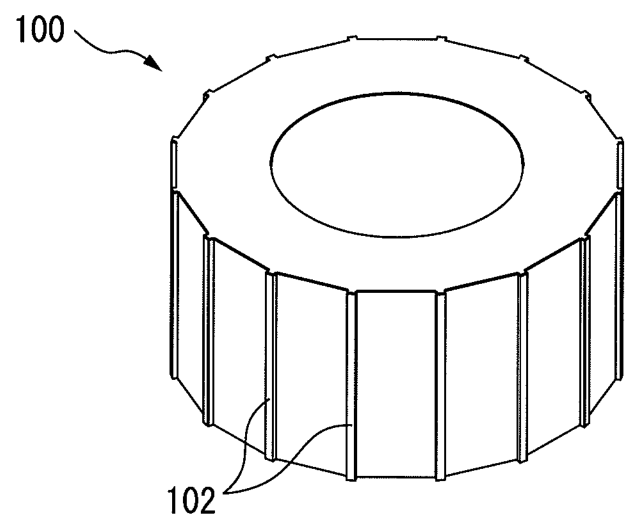
FIG. 8 is a view of a schematic configuration of an iron core constituting a rotor of an electric motor of the prior art.
Figure 9:
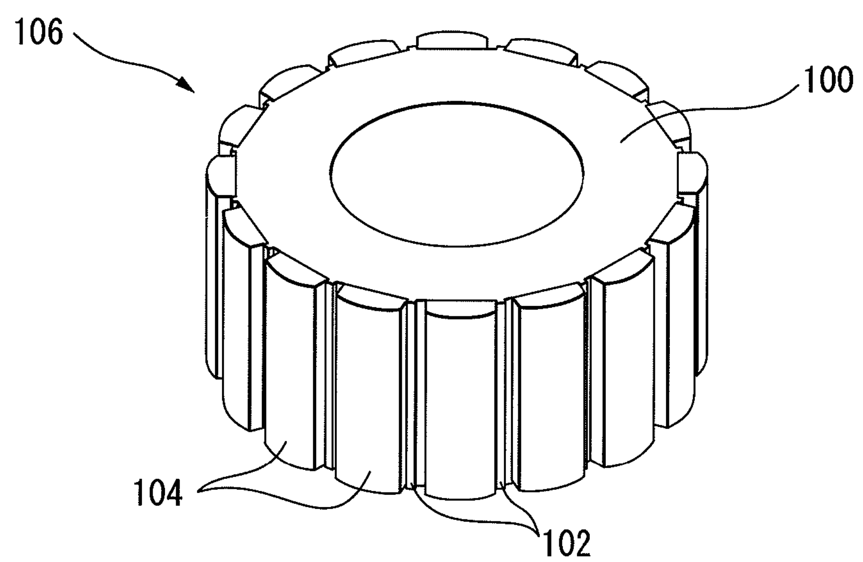
FIG. 9 is a view showing an example of a rotor constituted by adhering permanent magnets to the iron core of FIG. 8.
Figure 10:
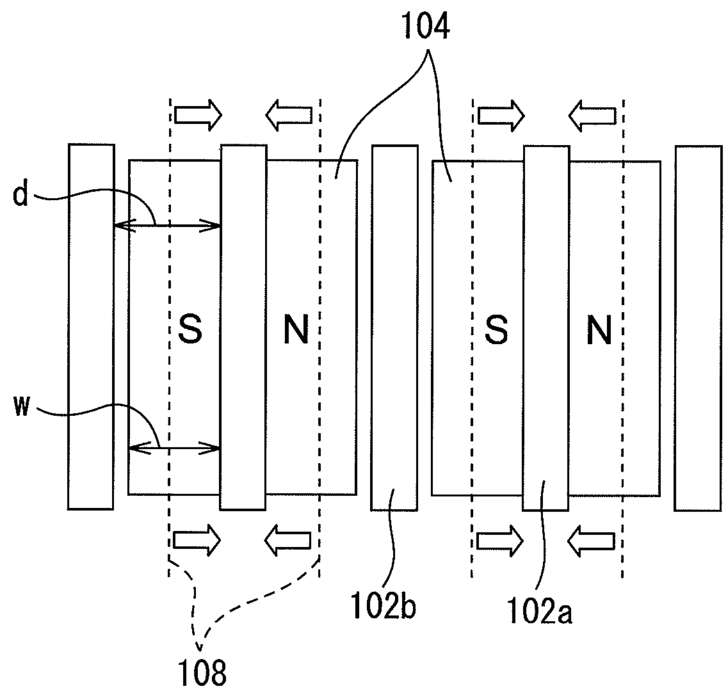
FIG. 10 is a view schematically showing a change in the position of each permanent magnet when the magnets are adhered to the iron core of FIG. 8.

FIG. 7 is a view schematically showing a change in the position of each permanent magnet when the magnets are adhered to iron core 10" of FIG. 6. As explained above, at each axial end of main body 14, a protrusion extending to or reaching the axial end and another protrusion not extending to or reaching the axial end are alternately positioned in the circumferential direction of main body 14. Therefore, with respect to the neighboring permanent magnets (for example, magnets **12*a* and 12*b*) between which protrusion 18*a*" extending to or reaching the axial end in region A exists, the ends of the magnets are attracted to each other in region B where protrusion 18*a*" does not extend to or reach the axial end. On the other hand, with respect to the neighboring permanent magnets (for example, magnets 12*b* and 12*c*) between which protrusion 18*b*" extending to or reaching the axial end in region B exists, the ends of the magnets are attracted to each other in region A where protrusion 18*b*" does not extend to or reach the axial end. As such, although each permanent magnet 12 is deviated or inclined from the ideal magnet center position indicated by dashed line 22. However, as shown in FIG. 7, the neighboring permanent magnets are inclined in the opposing directions, the generated cogging torque is significantly reduced. The reason therefor has been explained with reference to FIG. 3**.

As in the third embodiment, when magnet adhering surface 16 is machined so that each protrusion 18" extends parallel to the axial direction of iron core 10" and so that the magnets neighboring in the circumferential direction have the shorter and longer ends alternately, the machining can be easily carried out by means of a tool such as an end mill, whereby a machining cost may be low. Further, it is not necessary to form each permanent magnet into a variant shape such as a trapezoidal (in other words, not a simple rectangular parallelepiped), and thus the magnet can also be manufactured at low cost.

In the third embodiment, each protrusion 18" has a ridge (or an elongated rectangular parallelepiped) shape wherein boundary 20 is a symmetry axis thereof. However, each protrusion may have another shape as long as the protrusion can limit the position and orientation of each permanent magnet so that the neighboring magnets are inclined in opposing directions by attractive force thereof. For example, a side of the ridge shape parallel to the axial direction may not be a straight line.

In the present invention, the shape of each permanent magnet is not particularly limited. However, each permanent magnet may be formed into a simple rectangular parallelepiped in the above embodiments, whereby the magnet can be manufactured at low cost.

According to the present invention, in a synchronous electric motor wherein the LCM of the number of pairs of poles "p" and the number of slots "s" is an odd multiple of "p," by inclining one end of each permanent magnet in a direction so as to be attracted by one of neighboring magnets, and by inclining the other end of the permanent magnet in a direction so as to be attracted by the other of the neighboring magnets, the cogging torque is canceled at the both axial ends, whereby the cogging torque due to the positional deviation of the permanent magnet can be prevented. Further, since each permanent magnet may be formed into a simple rectangular parallelepiped, whereby the synchronous electric motor can be provided at low cost.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A synchronous electric motor having s slots and 2p poles, wherein a lowest common multiple of s and p is an odd multiple of p, the synchronous electric motor having a rotor comprising:

an iron core having a plurality of protrusions for positioning permanent magnets; and a plurality of permanent magnets positioned on the iron core, wherein the protrusions are arranged on the iron core so that one end of each permanent magnet is inclined towards one of neighboring permanent magnets so as to be attracted to the one of the neighboring permanent magnets, and so that the other end of each permanent magnet is inclined towards the other of neighboring permanent magnets so as to be attracted to the other of the neighboring permanent magnets, wherein each protrusion has a trapezoidal shape having a height in a direction of a rotation axis of the iron core, wherein the iron core includes a first region and a second region defined by dividing the iron core into two halves in a direction of a rotation axis thereof, and wherein a first protrusion and a second protrusion are alternately positioned in a circumferential direction of the iron core, the first protrusion having a long side positioned in the first re ion and a short side positioned in the second region, and the second protrusion having a short side positioned in the first region and a long side positioned in the second region.

2. The synchronous electric motor as set forth in claim 1, wherein each permanent magnet has a rectangular parallelepiped shape.

* * * * *